United States Patent [19]

Chauviere

[11] Patent Number: 4,536,100
[45] Date of Patent: Aug. 20, 1985

[54] PART TO BE ASSEMBLED AND SUB-ASSEMBLY COMPRISING SAID PART AND A NUT

[75] Inventor: Henri Chauviere, Courbevoie, France

[73] Assignee: Etudes Techniques et Representations Industrielles E.T.R.I., Neuilly sur Seine, France

[21] Appl. No.: 480,139

[22] Filed: Mar. 29, 1983

[30] Foreign Application Priority Data

Apr. 2, 1982 [FR] France ................ 82 05724

[51] Int. Cl.³ .................. B65D 59/00; F16B 33/00
[52] U.S. Cl. ........................ 403/12; 403/21; 403/17; 403/19; 411/523; 411/174
[58] Field of Search .............. 403/12, 21, 22, 408, 403/17, 19; 411/523, 522, 524, 174, 175, 172

[56] References Cited

U.S. PATENT DOCUMENTS 2,170,739  8/1939  Tinnerman ............... 403/21
3,110,372  11/1963 Pierce et al. ............ 403/21
3,952,475  4/1976  Paskert ................. 411/522 X
4,396,326  8/1983  McKinnie et al. ........ 411/175 X Primary Examiner—Andrew V. Kundrat
Attorney, Agent, or Firm—Young & Thompson

[57] ABSTRACT

The part comprises a hole surrounded by a boss having an end surface perpendicular to its side surface. The nut comprises a threaded screwing cap connected to the base of a coupling mounting having also two legs between which the boss is to be inserted. Near its end surface, the boss is provided with projections, each of which is inserted between one of the legs and the cap.

8 Claims, 6 Drawing Figures

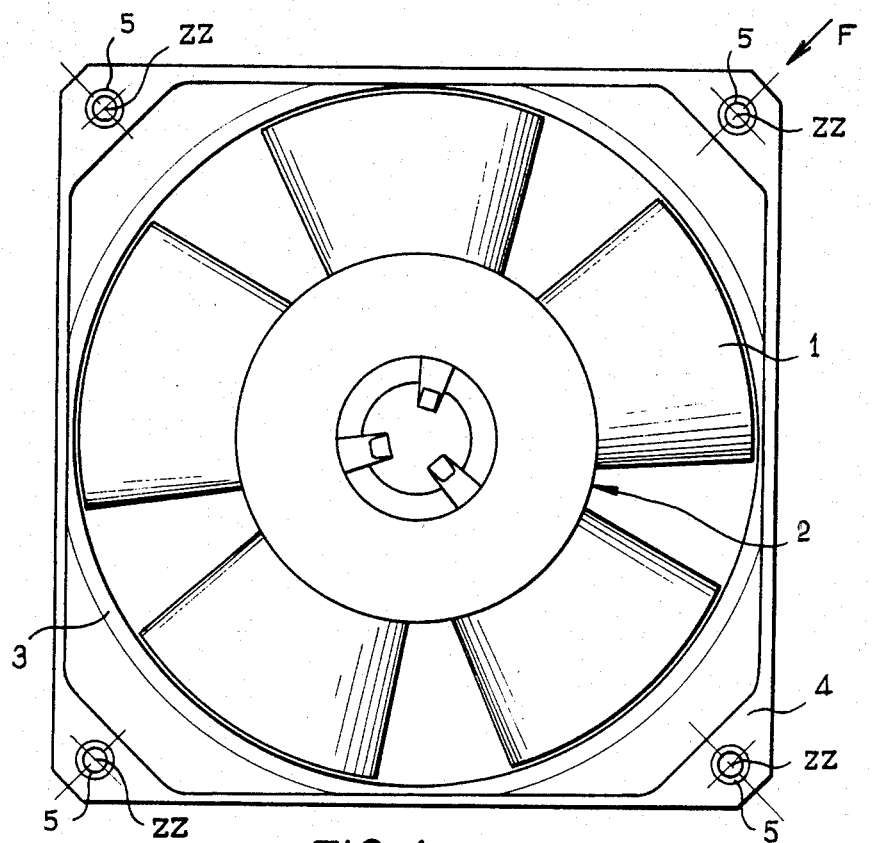
FIG_1
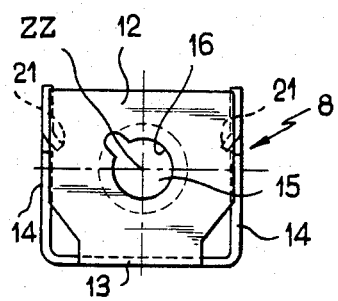
FIG_5
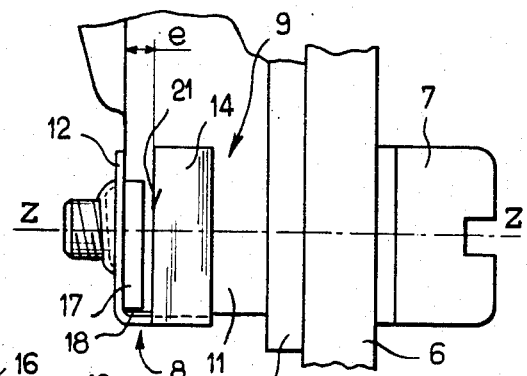
FIG_4
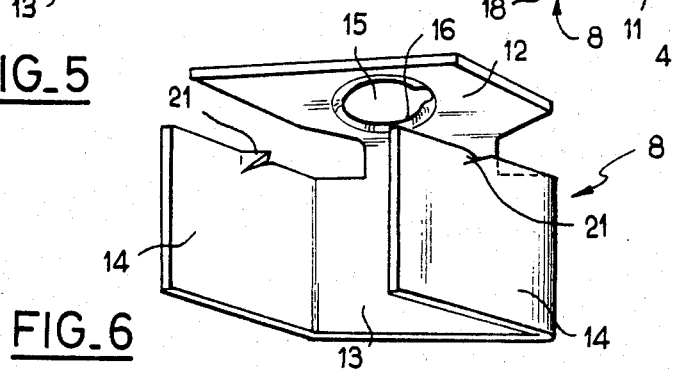
FIG_6

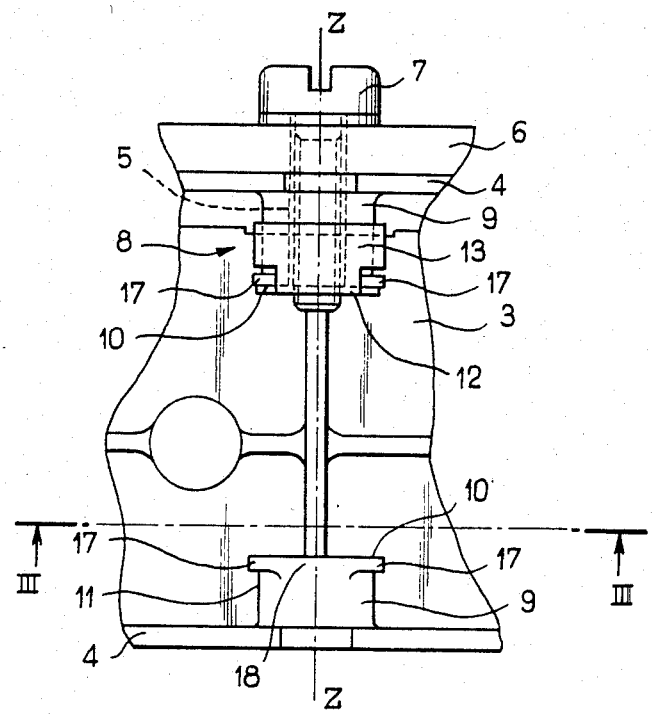
FIG_2
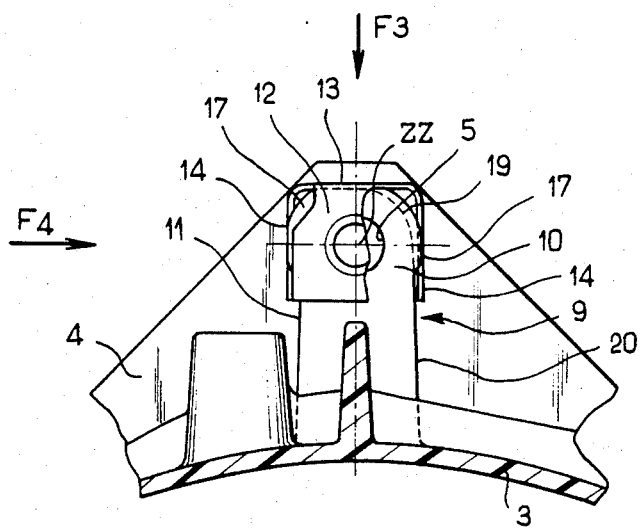
FIG_3

PART TO BE ASSEMBLED AND SUB-ASSEMBLY COMPRISING SAID PART AND A NUT

The present invention relates to a sub-assembly comprising a part to be assembled and a nut, intended to be associated with at least one second part to be assembled and with a threaded element such as a screw, the latter cooperating with the nut to fasten the parts together.

To facilitate the screw-nut assembling of parts, a known method includes pre-manufacturing a sub-assembly comprising the nut and one of the parts to be assembled which is provided with a hole therethrough and is to be adjacent to the nut once the assembly is completed. To this end the part to be assembled may be provided with a boss having an end surface surrounding the outlet of the hole for the screw, and a side surface surrounding at least partly this hole, the nut having a screwing cap facing the end surface of the boss and intended to rest on it, two legs bound up with the screwing cap and receiving between them the side surface of the boss, as well as means for abutment of the nut against the boss in a position of end of insertion along a direction perpendicular to the axis of the hole.

Generally the side surface of the boss is approximately cylindrical and its cross-section is circular or comprises at least a semicircle. The mounting operation of the nut consists in pushing it in the aforementioned direction so that the side surface of the boss or its semicircular part is inserted between the legs till the abutment means prevents such further displacement. The screwing cap is then coaxial with the hole. The legs are usually provided with means such as teeth made from slashes to prevent any disengagement displacement or any rotation of the nut around the boss when the cross-section of the latter is circular. However, if during assembling the screw is fitted carelessly, especially when an automatic screwing machine is used, the nut might be driven out by the pressure exerted by the end of the screw.

One object of the invention is to overcome this drawback.

In the sub-assembly according to the invention, the side surface of the boss is provided with at least one projection located between the end surface and at least one of the legs of the nut so as to prevent these latter from moving towards the end surface and consequently prevent the nut from getting dissociated from the boss.

The projection is for instance adjacent to the end surface of the boss. On the other hand the side surface may yet be provided, along that part of its length intended to be covered by the legs of the nut, with a cylindrical shape and/or a cross-section comprising at least approximately a semicircle.

The nut may advantageously be made as a single piece, made of sheet metal, the screwing cap and the two legs being folded at approximately right angles from a base forming a stop intended to abut against the boss in the aforesaid position of end of insertion, the base forming with the two legs a U mounting.

The invention also contemplates a part to be assembled which is provided with one or more of the aforementioned features and is therefore adapted to cooperate with a nut to form a sub-assembly according to the invention.

Other features of the invention will be apparent from the detailed description given hereinafter for illustration, it being understood that the invention is not limited by the description.

In the attached drawings:

FIG. 1 is an axial view of a flat axial fan;

FIG. 2 is a partial view along arrow F of FIG. 1, of the fan housing assembled with a wall by means of a screw and a nut;

FIG. 3 is a partial sectional view along plane III—III of FIG. 2, of the sub-assembly constituted by the fan housing and the nut;

FIG. 4 is a partial view of the assembly along arrow F4 of FIG. 3;

FIG. 5 shows the nut used in the assembly of FIG. 2 and in the sub-assembly of FIG. 3; FIG. 6 is a perspective view of the nut.

The fan shown in FIG. 1 essentially comprises a propeller 1, a central driving electric motor housed inside the fan hub 2, and a housing which constitutes the part to be assembled according to the invention. This housing, which is partly seen in FIGS. 2 and 3, comprises a cylindrical hull 3 surrounding the propeller 1 and two square end flanges 4 perpendicular to the axis. Four holes 5, the axes of which are designed ZZ' are provided at the four corners of each flange 4 in order to allow one or the other of the flanges to be fastened by means of four screws, to the wall of an apparatus to be cooled by the fan. Thus in FIG. 2 one of the flanges 4 is mounted on a wall 6, and one of the screws 7 and one of the nuts 8 used to this end are seen. The nut 8 is also shown (partly broken away) in FIG. 3, and in FIGS. 4–6.

The fan housing and the nut 8 are made so as to constitute a sub-assembly making it easier to fasten the housing to the wall 6. To this end each of the holes 5 made through the flanges 4 is partly surrounded by a boss 9 having an end surface 10 where the hole opens and a side surface 11 surrounding the hole. The nut 8, which is shown with more details in FIGS. 4, 5 and 6, comprises a screwing cap 12 facing the end surface 10 and a hooking U mounting. The latter comprises a base 13 which by abutting against the side surface 11 helps in positioning the nut with respect to the boss at the end of the movement of insertion in a direction F3 (FIG. 3) perpendicularly to the axis of the hole 5. The U-mounting also comprises two legs 14 extending from the base 13 in the direction F3 and pressing on each side of the boss 9, on the side surface 11 thereof. The nut 8 is made of a single piece of sheet metal by folding the legs 14 and the cap 12 at right angles to the base 13, along three of the four edges of this latter. The screwing cap 12 has a central opening 15 the edge 16 of which has been given a helical coil conformation so as to cooperate with the thread of screw 7. As seen perpendicularly to the ZZ axis (FIG. 4), a spacing e is provided between the cap 12 and each of the legs 14.

According to the invention the side surface 11 of the boss 9 is provided with two projections 17 situated between the end surface 10 and the legs 14 so as to prevent the latter from moving towards the end surface under pressure of the end of the screw during assembling operations and therefore prevent the nut 8 from getting dissociated from the boss 9. The projections 17, are adjacent the end surface 10, and are made in the form of ribs, each adjacent one of the legs 14, and are separated by an area 18, free from projections, supportng the base 13. The projections 17 as measured parallel to axis ZZ, are smaller than the spacing e.

Apart from the projections 17, and especially in that part of its length covered by the legs 14, the side surface 11 has a cylindrical shape the axis of which is ZZ, and a cross-section comprising approximately a semi-circle 19 extended by straight lines 20, by which the boss is connected to the hull 3. The straight lines 20 are parallel to the abovementioned direction F3. The end surface is plane and perpendicular to the axis ZZ of the hole.

Placing the nut 8 on the boss 9 is made by pushing it according to arrow F3 (FIG. 3) and in such a way that the semicircle part of the side surface 11 of the boss gets inserted between the legs 14 and finally abuts against the base 13. The opening 15 of the screwing cap of the nut is then coaxial with the hole 5 of the flange. The legs 14 are provided with teeth 21 made from slashes folded back towards the boss and directed towards the base 13. These teeth clutch at the side surface 11 and prevent any motion of the nut in a direction opposed to that of the arrow F3. The nut is thus entirely locked with respect to the boss and forms with the housing a stable sub-assembly. The slashes of the teeth 21 communicated with the edge of the legs 14 which is near the cap 12. The teeth 21 which are thus adjacent this edge can rest on the projections 17 and the fact that they lift the legs with respect to the side surface 11 of the boss 9 brings with it no danger that the legs 14 go over the projections 17.

The invention is of course not limited to the above-described example. The side surface of the boss may have, in that part of its length covered with the legs of the nut, a cross-section comprising an arc well exceeding a semicircle, or even an entirely circular cross-section. In those cases the teeth 21, if provided, will also have the function of preventing the nut from rotating around the boss. Instead of the two projections 17 only one may be provided adjacent one only of the legs of the nut, or extending from one leg to the other. In the latter case the intermediate portion of the projection may be situated on that region of the side surface which is directed away from the abutment means, especially when the cross-section of the side surface is circular, or on the contrary may be situated adjacent the abutment means provided that the shape of the nut is such that the projection being there does not hinder the alignment between the hole of the part to be assembled and the opening of the nut. When the two requirements are fulfilled the projection can extend all around the boss. This or these projection(s) may be spaced from the end surface of the boss, there remaining between the former and the latter a portion of side surface having the same cross-section as that covered by the legs. Instead of making ribs, there may also be provided in the side surface of the boss one or more grooves in which the legs partly penetrate, whereby portions of the side surface which remain between the end surface and the grooves form projections with respect to the latter.

The screwing cap may be designed to be connected to one of the legs of the U mounting instead of being connected to its base. The two legs may also be directly connected to the cap by two bridges simultaneously forming stops for the projections which are slidably received in notches separating the cap from the legs outside the bridges.

The nut is not necessarily made of a single piece out of a folded metal sheet. The screwing cap may be made of usual nut with a threaded hole, connected to the coupling mounting by welding, setting or by any other means.

The invention may apply to the assembling of any part other than a fan housing. The parts to be assembled may be present in any number, mounted in a succession on a screw rod, the sub-assembly according to the invention being formed by the nut and that of the parts which is situated at the end of the row adjacent the nut.

What is claimed is:

1. A sub-assembly comprising a part to be assembled and a nut, the part to be assembled being provided with a hole therethrough, the hole being surrounded by a boss having an end surface surrounding the outlet of the hole and a side surface surrounding at least partly the hole, the nut comprising a screwing cap facing the end surface of the boss and intended to rest on it, two legs bound up with the screwing cap and receiving between them the side surface of the boss, as well as means for abutment of the nut against the boss in a position of end of insertion along a direction perpendicular to the axis of the hole, wherein the side surface of the boss is provided with at least one projection situated between the end surface of the boss and at least one of the legs of the nut so as to prevent the legs from moving towards the end surface and therefore prevent the nut from getting disengaged from boss.

2. A sub-assembly according to claim 1, wherein the projection is adjacent the end surface.

3. A sub-assembly according to claim 1, wherein the side surface of the boss is cylindrical in that part of its length where it is covered by the legs.

4. A sub-assembly according to claim 3, wherein the side surface has in the said part of its length a cross-section comprising at least approximately a semicircle.

5. A sub-assembly according to claim 1, wherein the means for abutment of the nut against the boss in the position of end of insertion comprises a base to which the two legs and the cap are connected, and wherein the nut is made up of a single piece of sheet metal by folding the two legs and the cap at right angles along edges of base.

6. A sub-assembly according to claim 1, wherein the legs of the nut are provided with teeth made from slashes folded back towards the boss and directed contrary to the said direction of insertion of the nut in order to prevent its extraction.

7. A sub-assembly according to claim 6, wherein at least some of the slashes are made from that edge of the legs which is near the screwing cap.

8. A part to be assembled, designed to form with a nut a sub-assembly according to claim 1, having therethrough a hole surrounded by a boss having an end surface surrounding the outlet of the hole and a side surface surrounding the hole, wherein the side surface of the boss is provided with at least one projection near the end surface.

* * * * *